United States Patent
Baba et al.

(10) Patent No.: US 9,372,061 B2
(45) Date of Patent: Jun. 21, 2016

(54) INNER DIAMETER MEASURING DEVICE

(71) Applicant: IHI Corporation, Koto-ku, Tokyo (JP)

(72) Inventors: Michiko Baba, Tokyo (JP); Kouzou Hasegawa, Tokyo (JP); Yuuichi Miura, Tokyo (JP); Norimasa Taga, Tokyo (JP); Tooru Fujii, Tokyo (JP)

(73) Assignee: IHI Corporation, Tokyo (JP)

( * ) Notice: Subject to any disclaimer, the term of this patent is extended or adjusted under 35 U.S.C. 154(b) by 42 days.

(21) Appl. No.: 14/377,227

(22) PCT Filed: Feb. 7, 2013

(86) PCT No.: PCT/JP2013/053597
§ 371 (c)(1),
(2) Date: Aug. 7, 2014

(87) PCT Pub. No.: WO2013/118916
PCT Pub. Date: Aug. 15, 2013

(65) Prior Publication Data
US 2015/0007440 A1      Jan. 8, 2015

(30) Foreign Application Priority Data

Feb. 9, 2012 (JP) ................................ 2012-026043

(51) Int. Cl.
*G01B 5/12* (2006.01)
(52) U.S. Cl.
CPC ........................................ *G01B 5/12* (2013.01)
(58) Field of Classification Search
CPC ........................................................ G01B 5/12
USPC ................... 33/542, 543, 544, 544.1
See application file for complete search history.

(56) References Cited

U.S. PATENT DOCUMENTS

| 1,664,851 | A | 4/1928 | Class |
| 1,721,524 | A | 7/1929 | Moore |
| 2,822,620 | A | 2/1958 | Ulfeldt |
| 3,247,732 | A | 4/1966 | Barnhart |

(Continued)

FOREIGN PATENT DOCUMENTS

| EP | 0076144 A2 | 4/1983 |
| EP | 0373514 A1 | 6/1990 |

(Continued)

OTHER PUBLICATIONS

European communication dated Sep. 9, 2015 in co-pending European patent application No. 13746779.1.

(Continued)

*Primary Examiner* — Christopher Fulton
(74) *Attorney, Agent, or Firm* — Nields, Lemack & Frame, LLC

(57) ABSTRACT

An inner diameter measuring device (50) for measuring an inner diameter of a hollow object to be measured, wherein the inner diameter measuring device comprises a circulation unit (1) and a measuring head (2) and is insertable into inside of an object to be measured, wherein the measuring head has a contact measuring unit (27) for measuring the inner diameter by contacting an inner surface of the object to be measured and an advancing/retreating unit (23) for making the contact measuring unit to advance and to retreat in a radial direction, and wherein the circulation unit can rotate the measuring head around a center line (51) of the inner diameter measuring device.

5 Claims, 5 Drawing Sheets

(56) References Cited

U.S. PATENT DOCUMENTS

| | | | |
|---|---|---|---|
| 3,436,967 A | 4/1969 | Post | |
| 3,771,350 A | 11/1973 | Romans | |
| 4,045,877 A * | 9/1977 | Rutter | G01B 5/12 33/542 |
| 4,382,338 A | 5/1983 | Possati et al. | |
| 4,536,963 A * | 8/1985 | Yamamoto | G01B 3/18 33/544.6 |
| 4,631,834 A | 12/1986 | Hayashi et al. | |
| 4,872,269 A | 10/1989 | Sattmann | |
| 4,937,524 A * | 6/1990 | Fasnacht | G01N 27/902 324/220 |
| 4,967,092 A | 10/1990 | Fraignier et al. | |
| 5,083,384 A * | 1/1992 | Possati | G01B 7/13 33/542 |
| 5,095,634 A | 3/1992 | Overlach et al. | |
| 5,224,274 A | 7/1993 | Blaiklock | |
| 5,259,119 A | 11/1993 | Yoshioka et al. | |
| 5,808,250 A | 9/1998 | Torii et al. | |
| 5,933,231 A | 8/1999 | Bieman et al. | |
| 6,243,962 B1 * | 6/2001 | Brock | B23B 29/02 33/542 |
| 6,249,007 B1 | 6/2001 | Gooch et al. | |
| 6,427,353 B1 | 8/2002 | Nelson et al. | |
| 6,931,149 B2 | 8/2005 | Hagene et al. | |
| 8,033,032 B2 * | 10/2011 | Fujikawa | G01B 5/12 33/542 |
| 8,841,603 B1 | 9/2014 | Blanton et al. | |
| 8,842,297 B2 | 9/2014 | Størksen et al. | |
| 9,145,924 B2 * | 9/2015 | Baba | F16D 3/04 |
| 2003/0198374 A1 | 10/2003 | Hagene et al. | |
| 2004/0114793 A1 | 6/2004 | Bondurant | |
| 2006/0044089 A1 | 3/2006 | Kang et al. | |
| 2006/0112577 A1 | 6/2006 | Jones | |
| 2006/0283037 A1 | 12/2006 | Galle | |
| 2008/0105067 A1 | 5/2008 | Frey | |
| 2009/0144999 A1 | 6/2009 | Lau | |
| 2010/0005676 A1 | 1/2010 | Fujikawa et al. | |
| 2010/0060904 A1 | 3/2010 | Keightley et al. | |
| 2010/0110448 A1 | 5/2010 | Johnson et al. | |
| 2011/0080588 A1 | 4/2011 | Segall | |
| 2015/0000465 A1 | 1/2015 | Baba et al. | |
| 2015/0002836 A1 | 1/2015 | Baba et al. | |
| 2015/0009322 A1 | 1/2015 | Baba et al. | |
| 2015/0015695 A1 | 1/2015 | Baba et al. | |
| 2015/0015873 A1 | 1/2015 | Baba et al. | |
| 2015/0020395 A1 | 1/2015 | Baba et al. | |
| 2015/0131109 A1 | 5/2015 | Baba et al. | |

FOREIGN PATENT DOCUMENTS

| | | | |
|---|---|---|---|
| EP | 1434076 A1 | 6/2004 | |
| EP | 2818825 A1 | 12/2014 | |
| FR | 2730304 A1 | 8/1996 | |
| GB | 1388475 A | 3/1975 | |
| JP | 50-159355 A | 12/1975 | |
| JP | 57-22501 A | 2/1982 | |
| JP | 58-66809 A | 4/1983 | |
| JP | 59-187155 A | 10/1984 | |
| JP | 61-144551 A | 7/1986 | |
| JP | 61-282659 A | 12/1986 | |
| JP | 63-55441 A | 3/1988 | |
| JP | 63-159708 A | 7/1988 | |
| JP | 1-195309 A | 8/1989 | |
| JP | 3-502491 A | 6/1991 | |
| JP | 5-62573 A | 3/1993 | |
| JP | 7-55426 A | 3/1995 | |
| JP | 7-29405 U | 6/1995 | |
| JP | 7-191269 A | 7/1995 | |
| JP | 8-14874 A | 1/1996 | |
| JP | 8-93876 A | 4/1996 | |
| JP | 9-311034 A | 12/1997 | |
| JP | 10-137962 A | 5/1998 | |
| JP | 10-197215 A | 7/1998 | |
| JP | 10-213404 A | 8/1998 | |
| JP | 2000-136923 A | 5/2000 | |
| JP | 2000-146564 A | 5/2000 | |
| JP | 2002-22671 A | 1/2002 | |
| JP | 2002-148036 A | 5/2002 | |
| JP | 2003-139525 A | 5/2003 | |
| JP | 2003-329606 A | 11/2003 | |
| JP | 2004-176852 A | 6/2004 | |
| JP | 3105724 U | 11/2004 | |
| JP | 2005-315814 A | 11/2005 | |
| JP | 2005-331333 A | 12/2005 | |
| JP | 2006-153546 A | 6/2006 | |
| JP | 2006-156138 A | 6/2006 | |
| JP | 2006-229551 A | 8/2006 | |
| JP | 2006-234525 A | 9/2006 | |
| JP | 2007-57305 A | 3/2007 | |
| JP | 2007-71852 A | 3/2007 | |
| JP | 2007-248465 A | 9/2007 | |
| JP | 2007-292699 A | 11/2007 | |
| JP | 4230408 B2 | 2/2009 | |
| JP | 2010-164334 A | 7/2010 | |
| JP | 2011-2439 A | 1/2011 | |
| JP | 2011-13060 A | 1/2011 | |
| WO | 97/02480 A1 | 1/1997 | |
| WO | 2007051332 A2 | 5/2007 | |
| WO | 2009152851 A1 | 12/2009 | |
| WO | 2013/118918 A1 | 8/2013 | |

OTHER PUBLICATIONS

Office action mailed Sep. 1, 2015 in co-pending U.S. Appl. No. 14/377,238.
Office Action mailed Mar. 25, 2015 in co-pending U.S. Appl. No. 14/377,225.
Notice of Allowance mailed Jul. 13, 2015 in co-pending U.S. Appl. No. 14/377,225.
International Search Report and Written Opinion mailed Apr. 23, 2013 in co-pending PCT application No. PCT/JP2013/053589.
International Preliminary Report on Patentability mailed Aug. 21, 2014 in co-pending PCT application No. PCT/JP2013/053589.
International Search Report and Written Opinion mailed Apr. 4, 2013 in co-pending PCT application No. PCT/JP2013/053590.
International Preliminary Report on Patentability mailed Aug. 21, 2014 in co-pending PCT application No. PCT/JP2013/053590.
International Search Report and Written Opinion mailed Apr. 23, 2013 in co-pending PCT application No. PCT/JP2013/053591.
International Preliminary Report on Patentability mailed Aug. 21, 2014 in co-pending PCT application No. PCT/JP2013/053591.
International Search Report and Written Opinion mailed May 7, 2013 in co-pending PCT application No. PCT/JP2013/053592.
International Preliminary Report on Patentability mailed Aug. 21, 2014 in co-pending PCT application No. PCT/JP2013/053592.
International Search Report and Written Opinion mailed Mar. 12, 2013 in co-pending PCT application No. PCT/JP2013/053599.
International Preliminary Report on Patentability mailed Aug. 21, 2014 in co-pending PCT application No. PCT/JP2013/053599.
International Search Report and Written Opinion mailed May 7, 2013 in corresponding PCT application No. PCT/JP2013/053597.
International Preliminary Report on Patentability mailed Aug. 21, 2014 in corresponding PCT application No. PCT/JP2013/053597.
International Search Report and Written Opinion mailed Apr. 16, 2013 in co-pending PCT application No. PCT/JP2013/053598.
International Preliminary Report on Patentability mailed Aug. 21, 2014 in co-pending application No. PCT/JP2013/053598.
International Search Report and Written Opinion mailed Apr. 2, 2013 in co-pending PCT application No. PCT/JP2013/053603.
International Preliminary Report on Patentability mailed Aug. 21, 2014 in co-pending PCT application No. PCT/JP2013/053603.
European communication dated Sep. 4, 2015 in co-pending European patent application No. 13747139.7.
European communication dated Sep. 18, 2015 in co-pending European patent application No. 13746866.6.
European communication dated Sep. 14, 2015 in corresponding European patent application No. 13746596.9.
Final rejection mailed Dec. 29, 2015 in co-pending U.S. Appl. No. 14/377,238.

(56) References Cited

OTHER PUBLICATIONS

Office action mailed Dec. 30, 2015 in co-pending U.S. Appl. No. 14/377,226.
European communication dated Oct. 7, 2015 in co-pending European patent application No. 13747245.2.
European communication dated Sep. 9, 2015 in co-pending European patent application No. 13746053.1.
European communication dated Nov. 11, 2015 in co-pending European patent application No. 13746339.4.
European communication dated Oct. 8, 2015 in co-pending European patent application No. 13746993.8.
Office action mailed Mar. 22, 2016 in co-pending U.S. Appl. No. 14/377,238.
Notice of Allowance mailed Feb. 16, 2016 in co-pending U.S. Appl. No. 14/377,237 Feb. 9, 2016.
Notice of Allowance mailed Mar. 1, 2016 in co-pending U.S. Appl. No. 14/377,237.
Office action mailed Apr. 18, 2016 in co-pending U.S. Appl. No. 14/377,230.
Notice of Allowance mailed May 13, 2016 in co-pending U.S. Appl. No. 14/377,226.

* cited by examiner

INNER DIAMETER MEASURING DEVICE

TECHNICAL FIELD

The present invention relates to an inner diameter measuring device for measuring an inner diameter of a hollow member—in particular, the invention relates to a contact type inner diameter measuring device.

BACKGROUND ART

As an inner diameter measuring device for measuring inner diameter of a hollow member, e.g. a device disclosed in the Patent Document 1 is known. In the inner diameter measuring device disclosed in the Patent Document 1, a jig is brought into contact with an inner surface of a pipe to be measured, and by bringing a probe in contact with the jig, the probe is brought indirectly into contact with inner surface of the pipe to be measured. Further, the pipe to be measured is rotated, and displacement of inner surface of the pipe to be measured is measured via the jig.

As a result, the result of the measurement contains error caused by interposition of the jig. Further, because the jig is interposed, a measurement can be performed only on a restricted portion such as an end or near an end of the pipe to be measured. Also, there have been problems in that a complicated structure is involved because the pipe to be measured is rotated, and also, in that the device must be designed in large scale in a case where the pipe to be measured is a long member.

To solve the problems as described above, it is an object of the present invention to provide an inner diameter measuring device, in which there is no need to rotate the pipe to be measured, and it is possible to measure inner diameter of an object to be measured because the device is designed in simple structure.

CONVENTIONAL ART REFERENCE

Patent Document 1: JP-A-2006-153546

DISCLOSURE OF THE INVENTION

The present invention relates to an inner diameter measuring device for measuring an inner diameter of a hollow object to be measured, wherein the inner diameter measuring device comprises a circulation unit and a measuring head and is insertable into inside of an object to be measured, wherein the measuring head has a contact measuring unit for measuring the inner diameter by contacting an inner surface of the object to be measured and an advancing/retreating unit for making the contact measuring unit to advance and to retreat in a radial direction, and wherein the circulation unit can rotate the measuring head around a center line of the inner diameter measuring device.

Further, the present invention relates to an inner diameter measuring device, wherein the measuring head holds the contact measuring unit and comprises a measuring unit holder being able to move the contact measuring unit in radial direction, a scale sensor movable integrally with the measuring unit holder, and a linear scale provided in parallel to moving direction of the contact measuring unit, wherein a measurement of the inner diameter is determined based on a detection result of the scale sensor and on a detection result of the contact measuring unit.

Further, the present invention relates to an inner diameter measuring device, wherein the circulation unit is provided at a front end of a rod-like supporting member.

Further, the present invention relates to an inner diameter measuring device, wherein a center of gravity of the measuring head is at a position on the center line or approximately at a position on the center line.

Further, the present invention relates to an inner diameter measuring device, wherein the measuring head has a measuring unit supporting base plate to be circulated by the circulation unit, the advancing/retreating unit is provided on the measuring unit supporting base plate via two sets of linear guides, wherein each of the linear guides comprises a pair of advancing/retreating guide rails and a pair of blocks slidably fitted to the advancing/retreating guide rails, wherein with respect to one of the linear guides, the advancing/retreating guide rail is provided on the measuring unit supporting base plate, and the block is provided on the advancing/retreating unit, and with respect to the other of the linear guides, the advancing/retreating guide rail is provided on the advancing/retreating unit and the block is provided on the measuring unit supporting base plate.

BEST MODE FOR CARRYING OUT THE INVENTION

Description will be given below on embodiments of the present invention by referring to the attached drawings.

Figure 1:
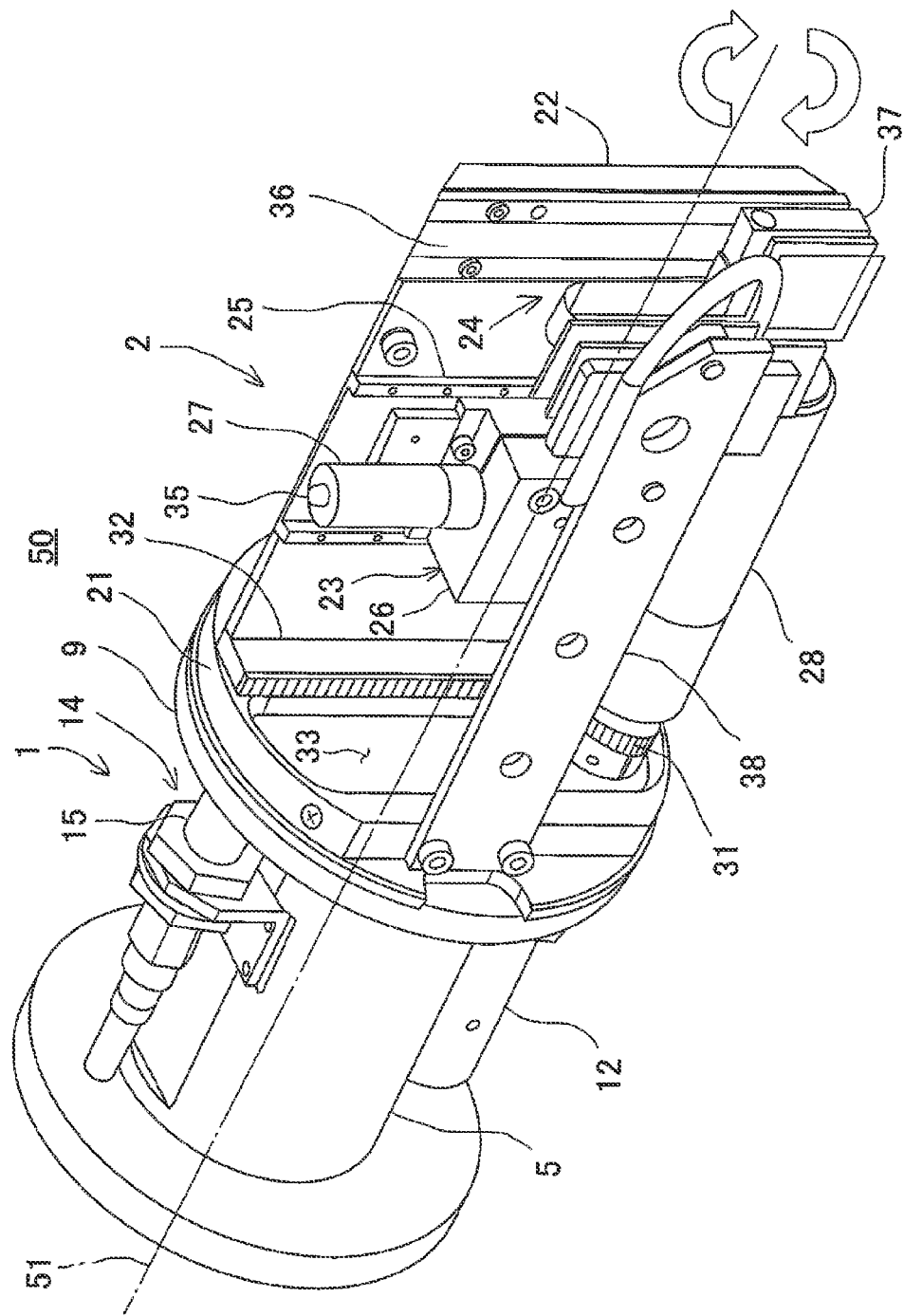
FIG. 1 is a perspective view of an inner diameter measuring device of a first embodiment of the present invention in a condition where the cover is removed.
Figure 2:
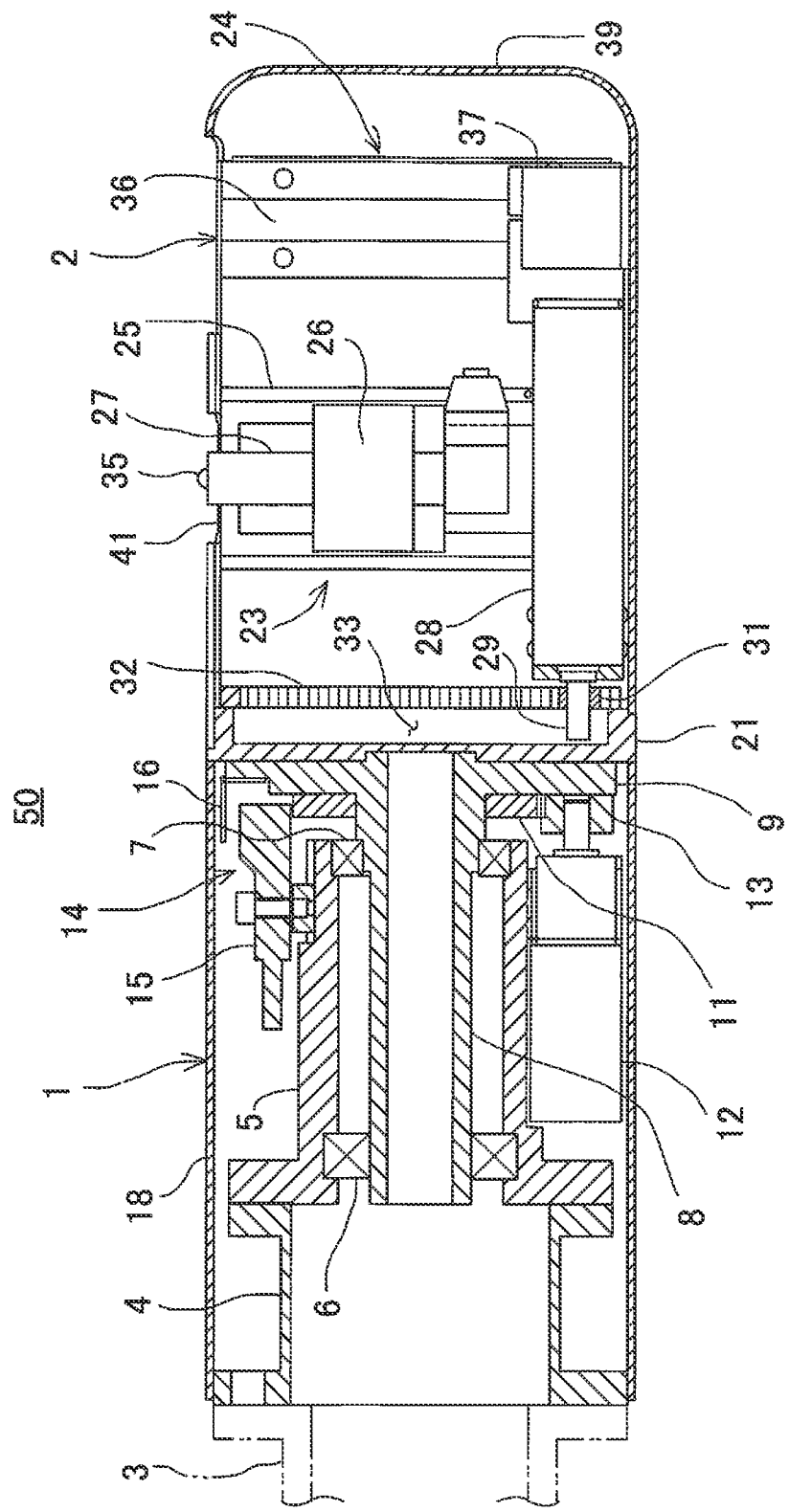
FIG. 2 is a cross-sectional view of the inner diameter measuring device.

FIG. 1 and FIG. 2 each represents an inner diameter measuring device 50 according to a first embodiment. In the figures, reference numeral 1 denotes a circulation unit, numeral 2 denotes a measuring head, and numeral 51 denotes a center line of the inner diameter measuring device 50.

First, a description will be given on the circulation unit 1.

A center line of the circulation unit 1 coincides with the center line 51 so that the circulation unit 1 can be mounted concentrically on a rod-like supporting member, e.g. a hollow shaft 3 (See FIG. 2).

On the hollow shaft 3, a hollow connection adapter 4 is mounted via a fixing member such as bolt, and it is so arranged that the hollow shaft 3 and the connection adapter 4 can be attached to or removed from each other. A hollow shaft holder 5 is mounted on the connection adapter 4. A center line of the shaft holder 5 coincides with the center line 51 and a circulation shaft 8 is held on the shaft holder 5 via bearings 6 and 7 so that the circulation shaft 8 can be rotated around the center line 51. It is preferable that the circulation shaft 8 is designed as a hollow member to reduce the weight.

On a front end of the circulation shaft 8 (on the right side in FIG. 2), a circulation flange 9 is formed. Further, a circulation gear 11 is fitted on the circulation shaft 8 on base side of the circulation flange 9.

A circulation motor 12 is provided at a position as required on outer surface of the shaft holder 5. On output shaft of the circulation motor 12, a circulation driving gear 13 is fitted closely, and the circulation driving gear 13 is engaged with the circulation gear 11. Further, the circulation motor 12 has an encoder (not shown) so that amount of rotation of the circulation driving gear 13, i.e. the circulation gear 11, can be detected.

At a position as required of the shaft holder 5, and at a position not interfering with the circulation motor 12, a circulation restricting means 14 of the circulation flange 9 is disposed. As an example of the circulation restricting means 14, a limit switch 15 is provided on the shaft holder 5, and a switch operating piece 16 to operate the limit switch 15 is provided on the circulation flange 9. In the present embodiment, a proximity switch is used as the limit switch 15. As the switch operating piece 16, a metal piece is used, which is set so as to oppose with a distance as required to the limit switch 15.

To cover the connection adapter 4, the shaft holder 5, the circulation flange 9, the circulation motor 12 and the circulation restricting means 14, a circulation unit cover 18 in cylindrical shape is provided to cover from a base end of the connection adapter 4 to the circulation flange 9. It is to be noted that the circulation unit cover 18 is not in contact with the circulation flange 9 and the circulation unit cover 18 is smaller than the inner diameter of the object to be measured.

Next, a description will be given on the measuring head 2.

The measuring head 2 has a circulation base plate 21 at a base end. When the circulation base plate 21 is fixed on the circulation flange 9, the circulation unit 1 and the measuring head 2 are connected with each other, and it is so arranged that the circulation unit 1 and the measuring head 2 are integrated with each other. The measuring head 2 is concentric with the circulation unit 1, i.e. the measuring head 2 is concentric with the hollow shaft 3. Namely, the circulation unit 1, the measuring head 2 and the hollow shaft 3 are so arranged that center lines of each of these coincides with the center line 51.

A measuring unit supporting base plate 22 is provided perpendicularly to the circulation base plate 21, and an advancing/retreating unit 23 and a scale unit 24 are provided on the measuring unit supporting base plate 22.

First, description will be given on the advancing/retreating unit 23.

On the measuring unit supporting base plate 22, an advancing/retreating guide rail 25 extending in a direction perpendicularly crossing the center line 51 is provided. A measuring unit holder 26 is slidably mounted on the advancing/retreating guide rail 25 and a contact measuring unit 27 is provided on the measuring unit holder 26. A measuring direction of she contact measuring unit 27 is in parallel to advancing/retreating direction of the measuring unit holder 26. That is, the contact measuring unit 27 moves in radial direction and the contact measuring unit 27 is so arranged that displacement in radial direction can be measured. As the contact measuring unit 27, an electric micrometer is used, for instance.

An advancing/retreating motor 23 is integrally provided on the measuring unit holder 26. The advancing/retreating motor 28 has an output shaft 29, which extends in parallel to the center line 51, and a pinion gear 31 is fitted closely on the output shaft 29. On the circulation base plate 21, a rack 32 is fixed in a direction perpendicularly crossing the center line 51, and the pinion gear 31 is engaged with the rack 32.

It is to be noted that in the figure, a reference numeral 33 denotes an escape hole to avoid interference with the output shaft 29. When the advancing/retreating motor 28 is driven, the pinion gear 31 is rotated, and it is so arranged that the advancing/retreating motor 28 and the advancing/retreating unit 23 are integrally advanced in radial direction and retreated in radial direction.

It is to be noted that in the figure, reference numeral 35 denotes a contact. The contact 35 is brought into contact with a measuring point, and a displacement of the contact 35 is detected by the contact measuring unit 27.

The scale unit 24 has a linear scale 36 provided in parallel to the advancing/retreating guide rail 25 and a scale sensor 37 integrally provided with the measuring unit holder 26, and the scale sensor 37 is displaced integrally with the displacement of the measuring unit holder 26. The scale sensor 37 is so arranged that the scale sensor 37 reads an amount of displacement from the linear scale 36, and the scale sensor 37 detects displacement in radial direction of the measuring unit holder 26.

Also, a measurement value to be read by the scale sensor 37 and a position of the contact 35 are regarded as a known value A. For instance, when the known value A is added to the measurement value of the scale sensor 37, a distance from the center line 51 to the contact 35 can be determined.

It is to be noted that, in the figure, reference numeral 38 denotes a cable holder to fix cables or the like (not shown).

The measuring unit supporting base plate 22, the advancing/retreating unit 23, the scale unit 24, the cable holder 38, etc. are covered by a measuring head cover 39 in cylindrical shape, and a measurement window 41 is prepared on the measuring head cover 39 so that the contact measuring unit 27 can protrude. An outer diameter of the measuring head cover 39 is equal to the outer diameter of the circulation unit cover 18, and is smaller than an inner diameter of the object to be measured.

Further, an arrangement and a weight of the components (such as the measuring unit holder 26, the advancing/retreating motor 28, the scale sensor 37, etc.) of the measuring head 2 are set up so that gravity center of the measuring head 2 comes on the center line 51 or approximately comes on the center line 51, or that the center of gravity of the measuring head 2 comes within a predetermined range around the center line 51 when the measuring unit holder 26 is moved. Further, in a case where the position of the center of gravity does not come on the center line 51 only by the arrangement of the components, the position of the center of gravity of the measuring head 2 is adjusted by providing an appropriate balance weight. Here, the predetermined range means a range where no change occurs on the measured value due to decentering from the center of gravity when the measuring head 2 is circulated.

Description will be given below about operation of the inner diameter measuring device 50 as described above.

The contact 35 is set to a condition where the contact 35 is completely retreated from outer surface of the measuring head cover 39, i.e. to standard position of the measuring unit holder 26. Under this condition, a position of the contact 35 (position in radial direction), i.e. a distance from the center line 51, is already known. The inner diameter measuring device 50 is inserted into the object to be measured via the hollow shaft 3, and position in axial direction of the inner diameter measuring device 50, i.e. measuring position, is determined.

Because the position of the contact 35 is already known, and also, an inner diameter of the object to be measured is already approximately known by rough measurement in advance, the measuring unit holder 26 is moved by a predetermined amount by the advancing/retreating unit 23. Then, the measuring unit holder 26 is moved gradually, and the contact 35 is brought into contact with inner surface of the object to be measured. From the detection value of the contact measuring unit 27 at this moment and from an amount of moving of the measuring unit holder 26 as detected by the scale sensor 37, an inner diameter of the object to be measured can be measured.

Further, the circulation motor 12 is driven, and the circulation shaft 8 is rotated via the circulation driving gear 13 and the circulation gear 11. Further, the measuring head 2 is rotated via the circulation flange 9. By rotating the measuring head 2 at a predetermined angle pitch, the inner diameter can be measured over entire inner periphery of the object to be measured.

Further, by moving the inner diameter measuring device 50 within the object to be measured in each measurement and at a predetermined distance, the inner diameter of the object to be measured can be determined over total length.

The circulation restricting means 14 is so restrict rotation so that the amount of rotation of the circulation flange 9 may not exceed 360° in one direction. When the limit switch 15 detects the switch operating piece 16, the circulation restricting means 14 is detected that the amount of rotation in one direction has reached 360°. Based on the result of detection by the limit switch 15, the circulation motor 12 is stopped or is rotated in reverse direction.

Because the outer diameter of the inner diameter measuring device 50 is set to less than the inner diameter of the object to be measured, the inner diameter can be measured by inserting the inner diameter measuring device 50 into the object to be measured, and the inner diameter can be measured even if the object to be measured is an object with longer length.

Further, because a position of the inner diameter measuring device 50 in axial direction can be easily set up by controlling depth of insertion of the inner diameter measuring device 50, and also, a measuring position can be easily set up by controlling the rotation of the circulation motor 12, the arbitrary position of an inner surface of the object to be measured can be measured with high accuracy.

Further, by setting the position of the center of gravity of the measuring head 2 on the center line 51, it is possible to prevent deviation of the measuring point and the change of the measurement result caused by the rotation of the measuring head 2.

Next, referring to FIG. 3 to FIG. 5, description will be given on a second embodiment.

The measuring head 2 comprises a measuring unit supporting base plate 56, a first linear guides 57 (57a and 57b) and a second linear guides 58 (58a and 58b) a table 59 movably supported. on the measuring unit supporting base plate 56 via the linear guides 57 and 58, a contact measuring unit 61 installed on front surface of the table 59, and a linear scale 62 having a scale 62a installed on back surface of the table 59 and a detecting means 62b installed on the measuring unit supporting base plate 56 to oppose the scale 62a.

Figure 3:
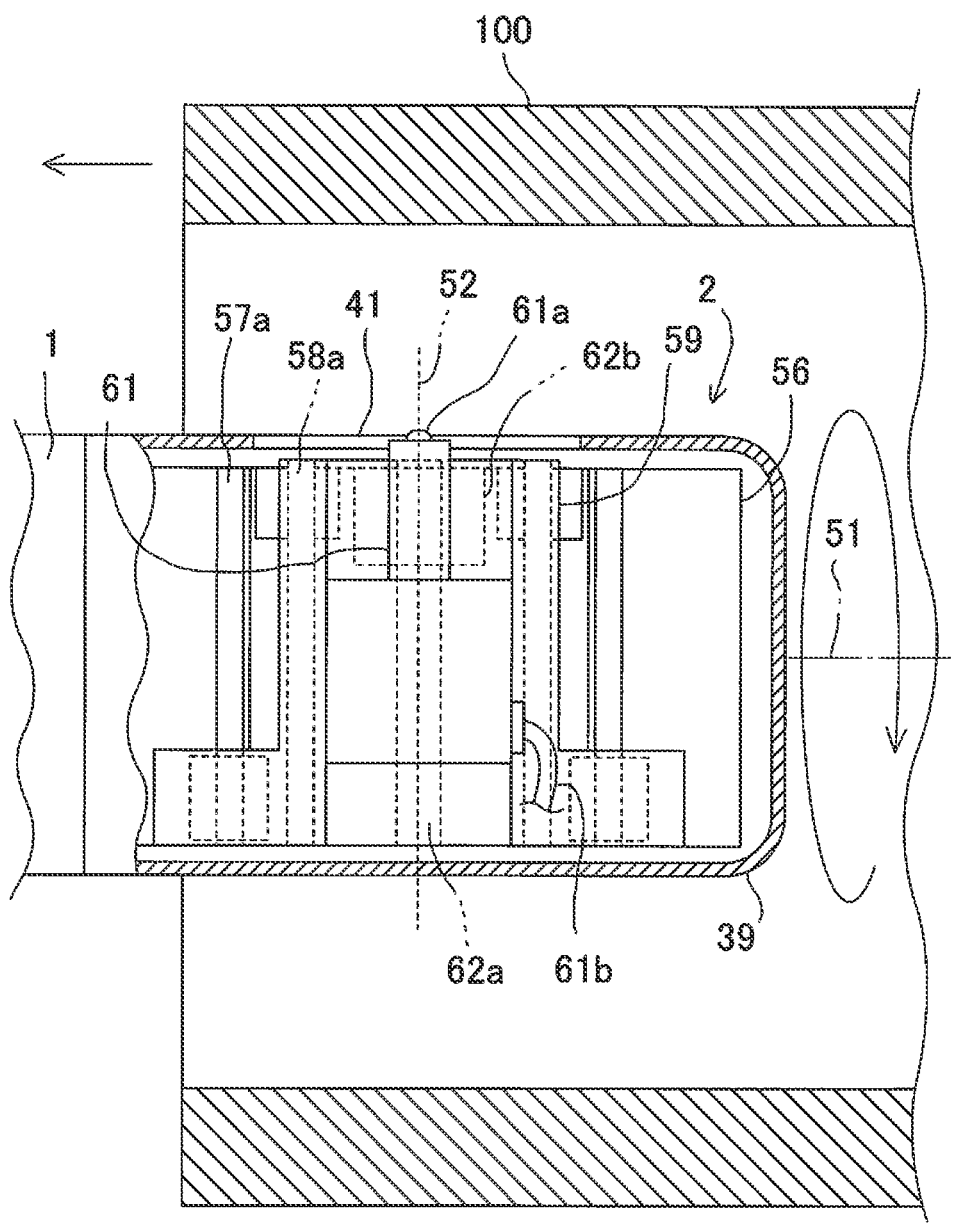
FIG. 3 is a cross-sectional view of a measuring head according to a second embodiment of the present invention.

As shown in FIG. 3, the measuring unit supporting base plate 56 is fixed perpendicularly on the circulation unit 1 and is rotated integrally with the rotation of the circulation unit 1. Also, the measuring unit supporting base plate 56 supports the table 59, which holds the contact measuring unit 61, via the linear guides 57 and 58.

The first linear guide 57 has two sets of an advancing/retreating guide rail 57a and a block 57b, and the second linear guide 58 has two sets of an advancing/retreating guide rail 58a and a block 58b. The linear guides 57 and 58 are so arranged that the advancing/retreating guide rails 57a and 58a are engaged with the blocks 57b and 58b respectively, and the blocks 57b and 58b are slidably engaged along the advancing/retreating guide rails 57a and 58a respectively.

Figure 4A:
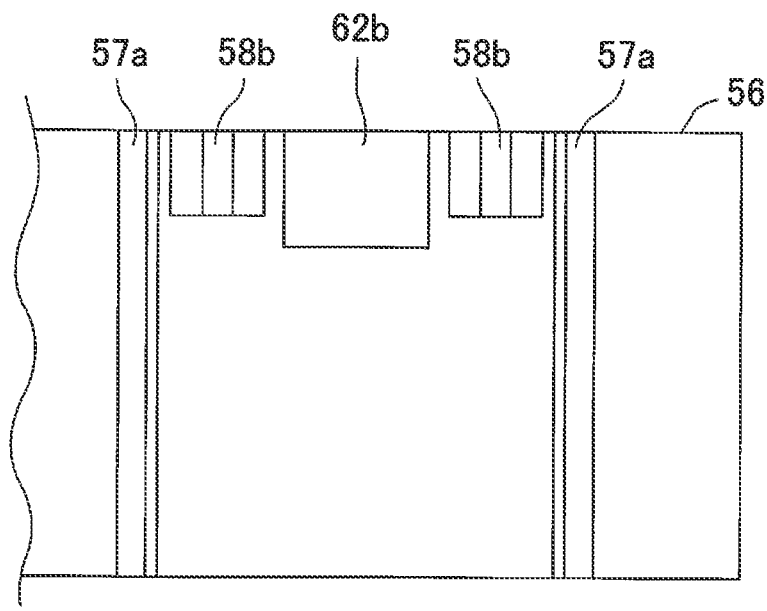
FIG. 4A and FIG. 4B are explanatory drawings of a linear scale in the second embodiment.
Figure 4B:
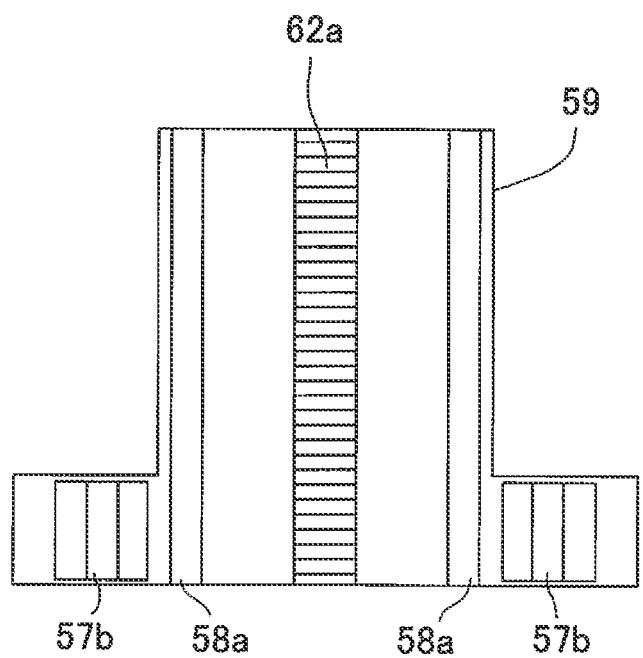
Figure 5A:
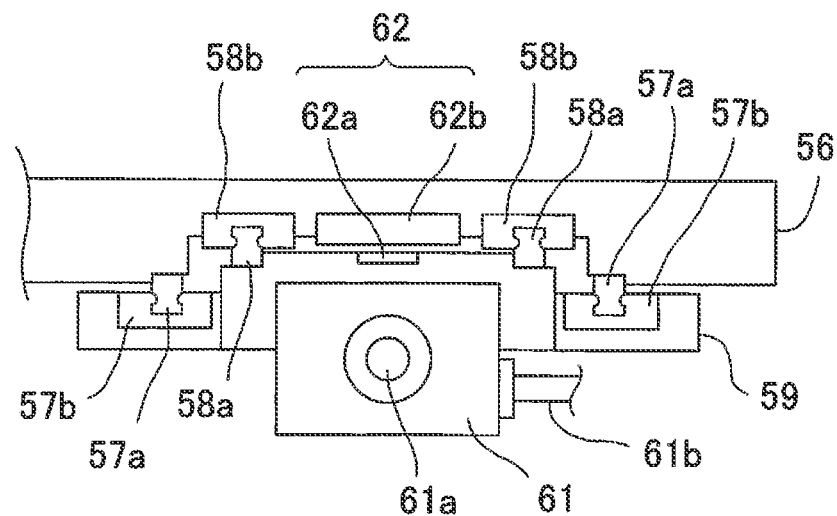
FIG. 5A is a plan view of a measuring head.
Figure 5B:
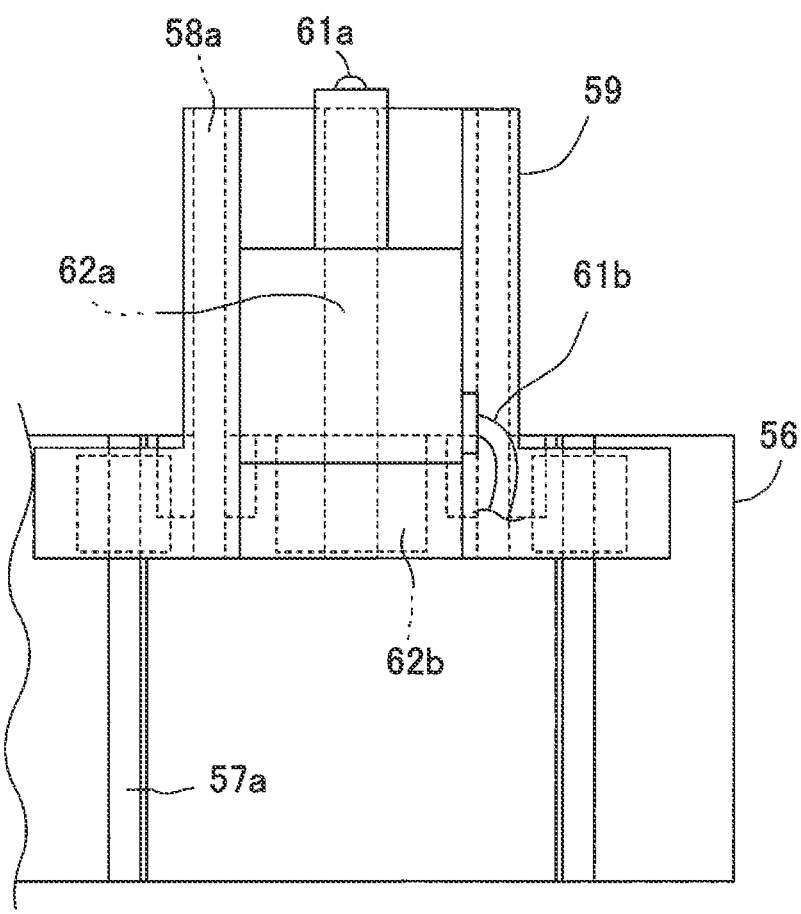
FIG. 5B is a front view in a condition where a contact measuring unit is protruded.

FIG. 4A is a front view of the measuring unit supporting base plate 56, and FIG. 4B is a rear view of the table 59. As shown in FIG. 3 and FIG. 4A, two advancing/retreating guide rails 57a of the first linear guide 57 are installed, perpendicularly cross the center line 51 of the rotation of the circulation unit 1. Further, as shown in FIG. 2 and FIG. 4B, the block 57b of the first linear guide 57 is disposed respectively at positions to oppose each of the advancing/retreating guide rails 57a on back surface of the table 59.

Further, as shown in FIG. 3 and FIG. 4B, two advancing/retreating guide rails 58a of the second linear guide 58 are installed to perpendicularly cross the center line 51 on back surface of the table 59. Also, as shown in FIG. 3 and FIG. 4A, the block 58b of the second linear guide 58 is disposed respectively at a position to oppose each of the advancing/retreating guide rails 58a on the measuring unit supporting base plate 56.

Being guided by the linear guides 57 and 58, the table 59 slides in a direction to perpendicularly cross the center line 51 on the measuring unit supporting base plate 56. Also, the contact measuring unit 61 held on front surface of the table 59 is moved integrally with the table 59. The table 59 is slided by the advancing/retreating motor 28. Since the mechanism of advancing/retreating is the same as the first embodiment, and the description is not given here.

The contact measuring unit 61 has a contact 61a, and the contact 61a is brought into contact with inner wall of the object to be measured 100, and a displacement of the contact 61a is measured. As described above, the measuring direction of the contact measuring unit 61 runs in parallel to the advancing/retreating direction of the table 59. That is, the contact measuring unit 61 moves in radial direction of the space of the object to be measured 100, and measures displacement in radial direction. A value measured by the contact measuring unit 61 is outputted to calculating means (not shown) via a cable 61b. The measuring unit supporting base plate 56 is fixed on the circulation unit 1 so that a center line 52 of a measuring direction of the contact measuring unit 61 perpendicularly crosses rotation axis of the circulation unit 1.

As shown in FIG. 4B, on back surface of the table 59, the scale 62a of the linear scale 62 is disposed between two advancing/retreating guide rails 58a and in parallel to the advancing/retreating guide rails 58a. Also, at a position of the measuring unit supporting base plate 56 to oppose the scale 62a, the detecting means 62b of the linear scale 62 is disposed. The linear scale 62 is a means to detect length, and the length is measured by detecting a graduation of the scale 62a.

Based on a value inputted from the contact measuring unit 61 and on a value inputted from the linear scale 62, the calculating means calculates the inner diameter of the object to be measured 100.

As described above, each of the advancing/retreating guide rails 57a of the first linear guide 57 are disposed at left-to-right symmetrical position with the axis 52 of the contact measuring unit 61 as reference. Also, each of the advancing/retreating guide rails 58a of the second linear guide 58 are disposed at left-to-right symmetrical positions with the axis 52 of the contact measuring unit 61 as reference. Further, the advancing/retreating guide rails 57a are installed, on the measuring unit supporting base plate 56, while the advancing/retreating guide rails 58a are disposed on the table 59 opposite to the measuring unit supporting base plate 56. Therefore, at the measuring head 2, the table 59 can be stably supported in three-dimensional direction. Values can be measured accurately by the contact measuring unit 61 and the linear scale 62, and measurement results with high accuracy can be obtained.

Also, because the linear scale 62 is disposed between the linear guides 57 and 58, a stable value can be obtained.

As described above, according to the present embodiment, an accurate inner diameter can be measured with high accuracy.

INDUSTRIAL APPLICABILITY

According to the present invention, an inner diameter measuring device for measuring an inner diameter of a hollow object to be measured, wherein the inner diameter measuring device comprises a circulation unit and a measuring head and is insertable into inside of an object to be measured, wherein the measuring head has a contact measuring unit for measuring the inner diameter by contacting an inner surface of the object to be measured and an advancing/retreating unit for making the contact measuring unit to advance and to retreat in a radial direction, and wherein the circulation unit can rotate the measuring head around a center line of the inner diameter measuring device. As a result, an inner diameter can be measured over the total circumference of the inner surface of the object to be measured without rotating, the object to be measured. Because the inner diameter is measured by inserting the device into the inside of the object to be measured, the measurement can be made not only on a region near end part but also over total length of the object to be measured.

LEGEND OF REFERENCE NUMERALS

1 Circulation unit
2 Measuring head
3 Hollow shaft
5 Shaft holder
8 Circulation shaft
11 Circulation gear
12 Circulation motor
13 Circulation driving gear
14 Circulation restricting means
15 Limit switch
16 Switch operating piece
21 Circulation base plate
23 Advancing/retreating unit
24 Scale unit
26 Measuring unit holder
27 Contact measuring unit
28 Advancing/retreating motor
31 Pinion gear
32 Rack
35 Contact
36 Linear scale
37 Scale sensor
50 Inner diameter measuring device
51 Center line
56 Measuring unit supporting base plate
57 First linear guide
58 Second linear guide

The invention claimed is:

1. An inner diameter measuring device for measuring an inner diameter of a hollow object to be measured, wherein said inner diameter measuring device comprises a circulation unit and a measuring head and is insertable into inside of an object to be measured, wherein said measuring head has a contact measuring unit for measuring the inner diameter by contacting an inner surface of the object to be measured and an advancing/retreating unit for making said contact measuring unit to advance and to retreat in a radial direction and a scale unit, and wherein said circulation unit can rotate said measuring head around a center line of said inner diameter measuring device, wherein said advancing/retreating unit has a measuring unit holder which holds said contact measuring unit and is able to move integrally with said contact measuring unit in radial direction and wherein said scale unit comprises a scale sensor movable integrally with said measuring unit holder and a linear scale provided in parallel to moving direction of said contact measuring unit, wherein a measurement of the inner diameter is determined based on an amount of moving of said measuring unit holder in radial direction as detected by said scale sensor and on a detection result of said contact measuring unit.

2. An inner diameter measuring device according to claim 1, wherein said circulation unit is provided at a front end of a rod-like supporting member.

3. An inner diameter measuring device according to claim 1, wherein a center of gravity of said measuring head is at a position on said center line or approximately at a position on said center line.

4. An inner diameter measuring device according to claim 1, wherein said measuring head has a measuring unit supporting base plate to be circulated by said circulation unit, said advancing/retreating unit is provided on said measuring unit supporting base plate via two sets of linear guides, wherein each of the linear guides comprises a pair of advancing/retreating guide rails and a pair of blocks slidably fitted to said advancing/retreating guide rails, wherein with respect to one of said linear guides, said advancing/retreating guide rail is provided on said measuring unit supporting base plate, and said block is provided on said advancing/retreating unit, and with respect to the other of the linear guides, said advancing/retreating guide rail is provided on said advancing/retreating unit and said block is provided on said measuring unit supporting base plate.

5. An inner diameter measuring device for measuring an inner diameter of a hollow object to be measured, wherein said inner diameter measuring device comprises a circulation unit and a measuring head and is insertable into inside of an object to be measured, wherein said measuring head has a contact measuring unit for measuring the inner diameter by contacting an inner surface of the object to be measured and an advancing/retreating unit for making said contact measuring unit to advance and to retreat in a radial direction, and wherein said circulation unit can rotate said measuring head around a center line of said inner diameter measuring device, wherein said measuring head has a measuring unit supporting base plate to be circulated by said circulation unit, said advancing/retreating unit is provided on said measuring unit supporting base plate via two sets of linear guides, wherein each of the linear guides comprises a pair of advancing/retreating guide rails and a pair of blocks slidably fitted to said advancing/retreating guide rails, wherein with respect to one of said linear guides, said advancing/retreating guide rail is provided on said measuring unit supporting base plate, and said block is provided on said advancing/retreating unit, and with respect to the other of the linear guides, said advancing/retreating guide rail is provided on said advancing/retreating unit and said block is provided on said measuring unit supporting base plate.

* * * * *